Figure 1:
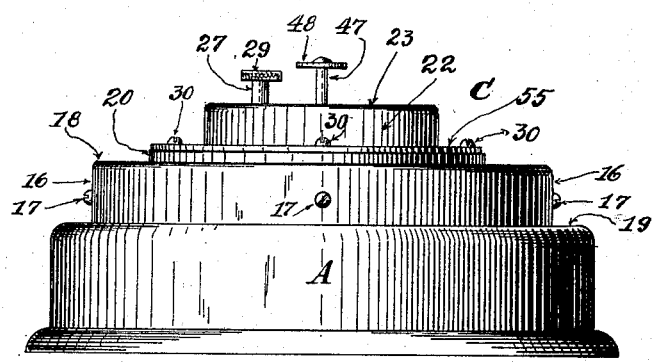

G. KERN.
VENDING APPARATUS.
APPLICATION FILED OCT. 12, 1916.

1,226,774.

Patented May 22, 1917.
4 SHEETS—SHEET 1.

WITNESSES:

INVENTOR:
GEORGE KERN,
BY
ATTORNEYS.

G. KERN.
VENDING APPARATUS.
APPLICATION FILED OCT. 12, 1916.

1,226,774. Patented May 22, 1917.
4 SHEETS—SHEET 2.

WITNESSES:
Al Stark
E B Knudsen

INVENTOR:
GEORGE KERN.
BY
Michael J Stark & Sons
ATTORNEYS.

G. KERN.
VENDING APPARATUS.
APPLICATION FILED OCT. 12, 1916.
1,226,774.
Patented May 22, 1917.
4 SHEETS—SHEET 3.
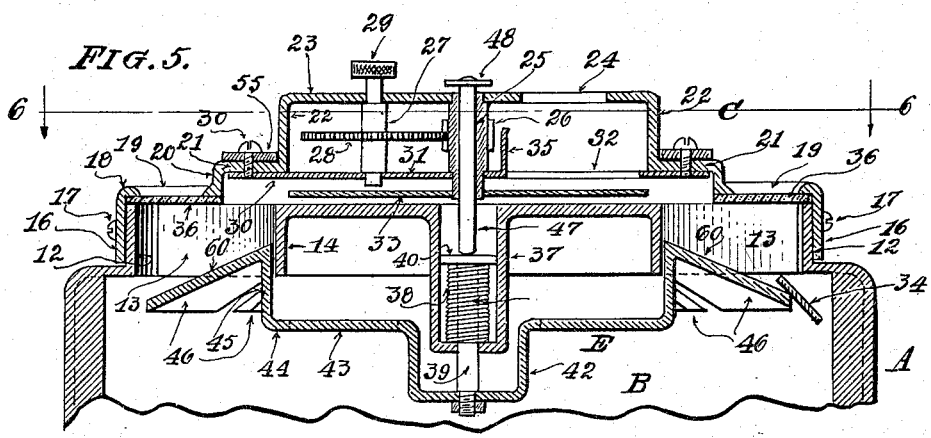
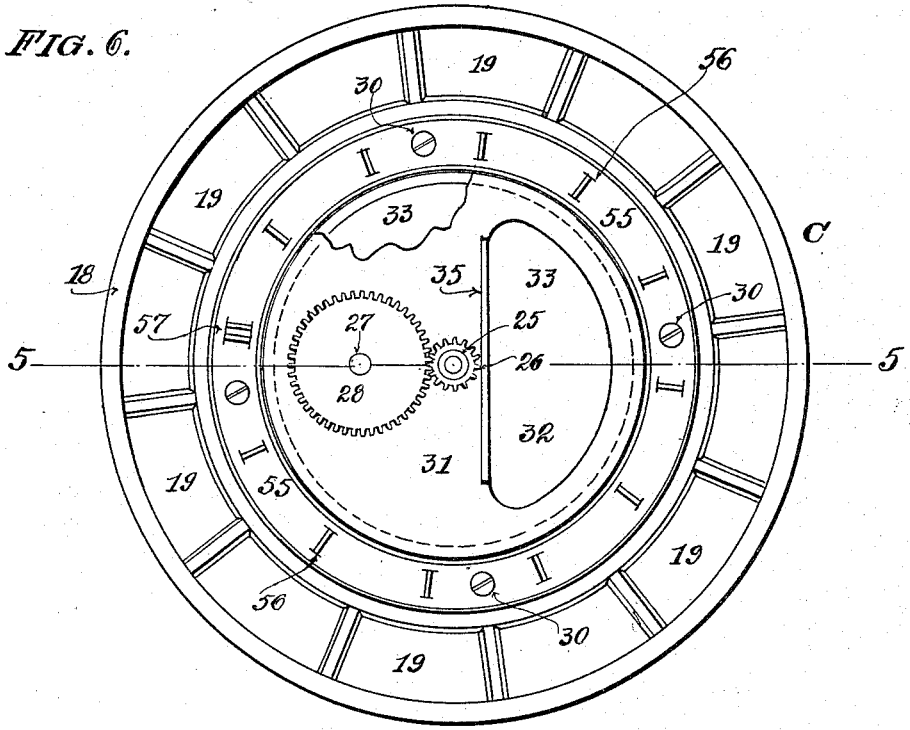
WITNESSES:
Al Stark
E. B. Knudsen
INVENTOR:
GEORGE KERN,
BY
Michael J Stark & Coey
ATTORNEYS.

G. KERN.
VENDING APPARATUS.
APPLICATION FILED OCT. 12, 1916.

1,226,774.

Patented May 22, 1917.
4 SHEETS—SHEET 4.

WITNESSES:
Al. Stark
E. B. Knudsen

INVENTOR.
GEORGE KERN,
BY
Michael J. Stark & Sons
ATTORNEYS.

UNITED STATES PATENT OFFICE.

GEORGE KERN, OF PERU, ILLINOIS.

VENDING APPARATUS.

1,226,774.   Specification of Letters Patent.   Patented May 22, 1917.

Application filed October 12, 1916. Serial No. 125,203.

*To all whom it may concern:*

Be it known that I, GEORGE KERN, an alien, former subject of the Empire of Germany, (who has declared his intention to become a citizen of the United States,) and resident of Peru, in the county of La Salle and State of Illinois, have invented certain new and useful Improvements in Vending Apparatus; and I do hereby declare that the following description of my said invention, taken in connection with the accompanying sheets of drawings, forms a full, clear, and exact specification, which will enable others skilled in the art to which my said invention appertains to make and use the same.

This invention has general reference to improvements in vending machines; and it consists, essentially, in the novel and peculiar combination of parts, and details of construction, as hereinafter first fully set forth and described, and then pointed out in the claims.

The present invention has for its object the production of an efficient, serviceable, and very attractive coin depository for use in retail stores, etc., where cash is received in payment for goods and merchandise purchased, services rendered, and where the amount involved is small, as for instance, the purchasing of cigars, pipes, cigarettes, candies, drinks, lunches and many other articles and vendibles, too numerous to mention. In connection with this coin depository there is mechanism, operable by the purchaser, which in a certain event to be hereinafter referred to, will entitle the purchaser to a predetermined discount, premium, or bonus, the prime object of my invention being to induce trade, and to prevent theft of money by unscrupulous employees.

Many of the retail, and department stores, have recognized the fact that the giving of premiums with the purchase of certain commodities induces trade; and the giving of stamps, coupons, and the like has become very common. Based upon this fact, my device will induce trade; and since the vender does not handle the purchase money there will be no opportunity for abstracting coins, giving short change, and other devices to defraud the purchaser or the vender.

In addition to the uses named, this device can be successfully employed in street cars for collecting fares, in moving picture theaters, boat houses, five, and ten cent stores; and since the apparatus is not complicated and consists of but a few parts, it can be manufactured and sold at a reasonable price.

Figure 2:
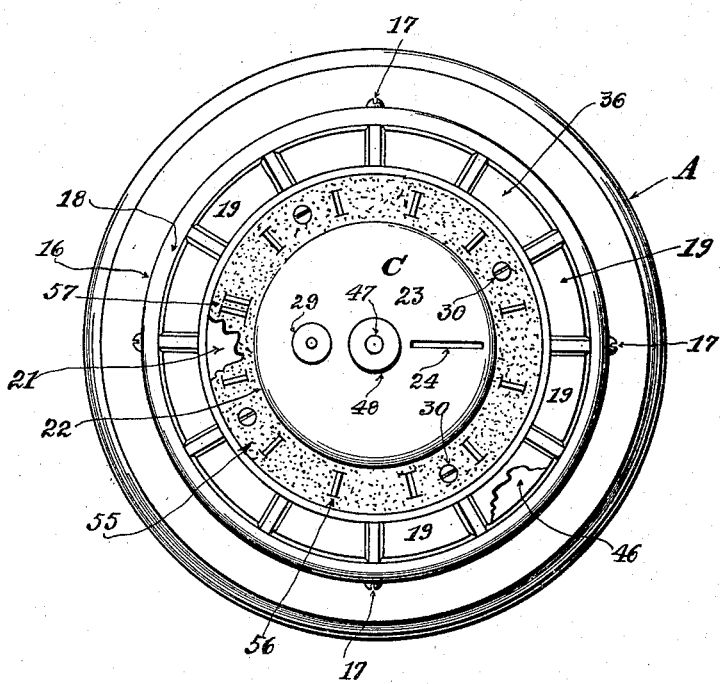
Figure 3:
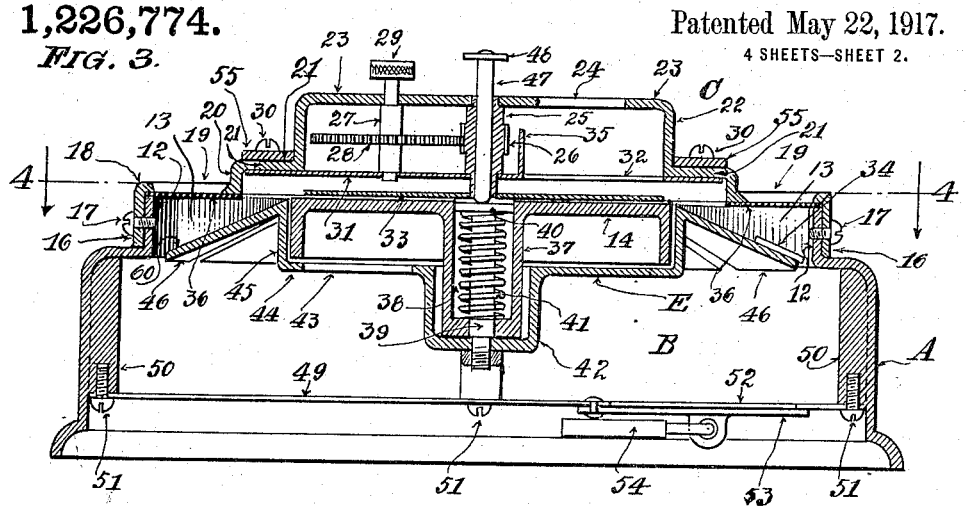
Figure 4:
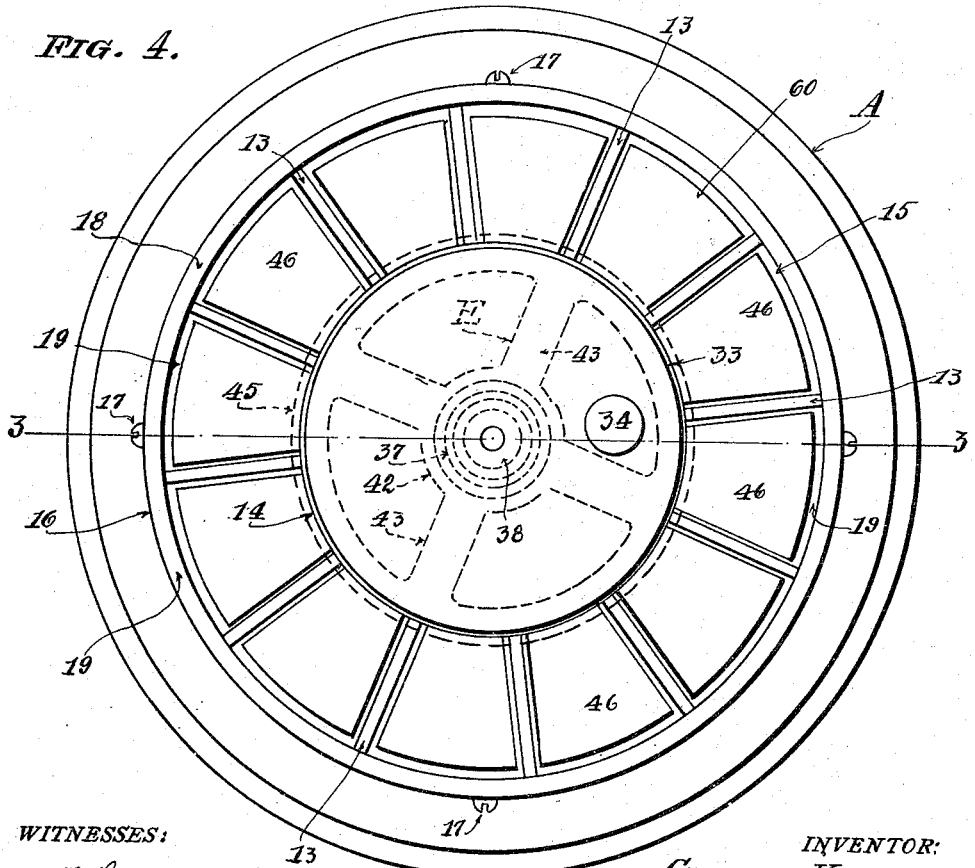
Figure 7:
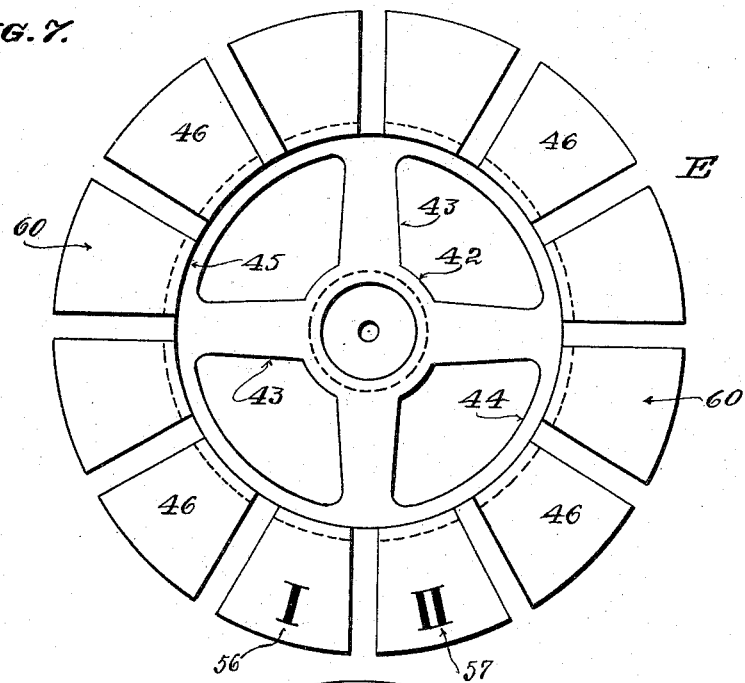
Figure 8:
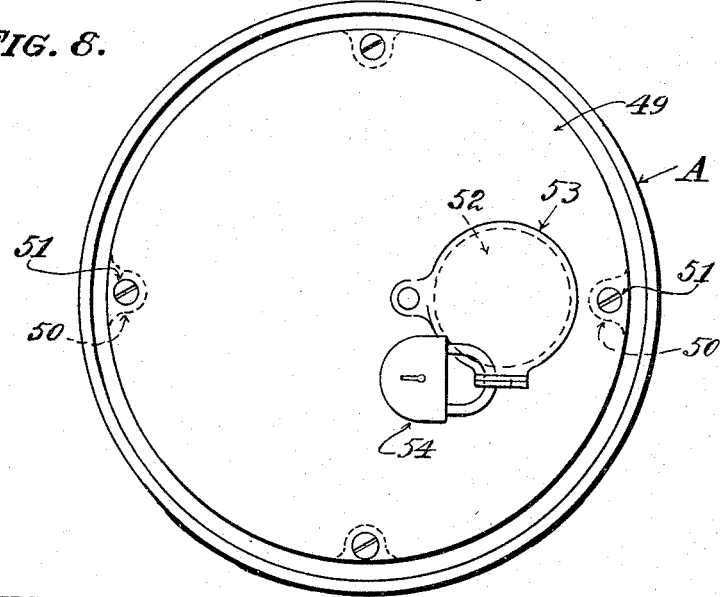

In the drawings already referred to, which serve to illustrate this invention more fully, and which form a part of this specification, Figure 1 is a side elevation of this vending apparatus and coin depository. Fig. 2 is a plan of the same. Fig. 3 is a transverse sectional elevation on line 3—3 of Fig. 4. Fig. 4 is a plan of the apparatus below the line 4—4, of Fig. 3. Fig. 5 is a sectional view of a part of the apparatus illustrating the parts in the coin-dropping position. Fig. 6 is a plan of the top-portion of the apparatus below the line 6—6 of Fig. 5. Fig. 7 is a plan of the coin-dropping member; and Fig. 8 is an inverted plan of the apparatus.

In these drawings A, designates the casing for this apparatus. It is, preferably, a round body of suitable dimensions, and affords a coin receptacle or coin container B. This casing is reduced in diameter at its upper end to form a short, tubular section 12; and radiating inwardly, and horizontally from said tubular section 12, there are a series of narrow bars 13, having an oblong transverse section and having a depth approximately that of the tubular extension 12.

These bars terminate in and are integrally formed with an inverted, cup-shaped body 14, thereby leaving between these bars open spaces 15, the object of which will hereinafter appear.

The casing A is closed at its upper end by a cover C, which cover is comprised of a downwardly extending rim 16, overlapping, by preference, the tubular section 12; and it is removably secured thereto by suitable means, such as screws 17. This rim 16 depends from a horizontally disposed flange 18; and in this flange there are a series of openings 19, preferably as many as there are bars in the casing, and registering with the spaces 13 therein. From this flange rises a short, vertical section 20, terminating in a horizontally disposed flange 21; and from this flange extends upwardly, a further vertical rim 22, which rim projects downwardly from a top plate 23. This cover C is, preferably, formed integrally with its rims and flanges; and it is especially adapted for production in the process of die-casting.

In the top plate 23, there is a coin slot 24, and centrally therein is a bore in which there is rotatably mounted a tubular shaft 25, on which there is mounted, or integrally formed, with said shaft 25, a gear pinion 26. Spaced from this tubular shaft 25, and journaled in the top plate 23, there is a further shaft 27, on which there is mounted a gear wheel 28, meshing with the gear pinion 26. The upper end of this shaft 27, protrudes from the top 23; and it carries at its upper end a milled or knurled button 29, by which the gear wheel and the pinion may be rapidly rotated. Underneath the flange 21 in the cover C, there is located an annular plate or disk 31, secured to the flange 21 by, preferably, screws 30; and in this plate there are two holes, properly located, to afford bearings for the lower ends of the pinion shaft 25, and the gear wheel shaft 27. And in this plate there is a further, larger, opening 32, through which a coin, passed through the coin slot 24, may drop.

To the lower end of the pinion shaft 25, there is secured an annular disk 33, upon which the coin 34 will lodge when dropped through the coin slot; and from this disk 33 this coin will be projected by centrifugal force when said disk 33 is rapidly revolved by whirling the button 29. At the side of the opening 32 in the plate 31, there is a transverse guard 35, to prevent the coin 34 from reaching the gearing already described.

Resting upon the upper margin of the vertical tubular portion 12 of the casing A, and underlying the flange 18, there is a transparent, annular ring, having plane surfaces, said ring, 36, being made from either glass, celluloid, or other transparent material, the object of which will be hereinafter explained.

Again referring to the cup-shaped member 14, forming a part of the casing A, this member 14 has centrally a downwardly extending hub 37, bored as at 38, and in this bore there is vertically movable, a bolt 39, said bolt having at its upper end a collar 40 slidable in said bore 38; and surrounding this bolt and bearing against the collar 40 at one end and the bottom of the bore 38, there is a coil spring 41. To the lower end of this bolt 39 there is secured a spider E, said spider consisting of a tubular hub 42, arms or spokes 43, and a rim 44. From this rim 44 rise a series of vertical bars 45; and from the upper end of each vertical bar deflects downwardly a plate 46, at such an angle that the coin 34 when located on the inclined top-surface of said plate 46, will readily slide off the same when permitted to do so.

As already stated, the pinion shaft 25 is tubularly formed, and in the bore of this shaft there is a vertically movable pin 47, projecting from the top of the cover C, and carrying at its upper end a thumb piece 48, by which said pin 47, acting upon the bolt 39 may be depressed, and with it the spider E.

The lower end of the casing A is closed by a bottom 49, secured to cleats or lugs 50, formed on the interior wall of the casing A, by screws or rivets 51. In this bottom there is an opening 52, which can be closed by a slide or similar means 53, and locked by preferably a pad lock 54. This opening 52 affords means for removing the coin from the coin depository B when it is desired to empty the same.

Upon the horizontal flange 21 on the cover C, there is located a, preferably metallic, ring 55, held to the flange 21 by the screws 30. This ring has on its face as many characters, letters or figures 56, as there are spaces 15 in the casing A, said characters being directly over the openings 19 in the horizontal flange 18 of the cover C. These characters are, preferably, alike, except one, 57, which should be different in order to differentiate that character from the remaining ones. In the drawings I have these characters 56 shown as the roman figure I, and the character 57, as the roman character II; but it is obvious that letter, or other indicia may be employed to serve the purpose hereinafter stated. In some cases I may prefer to dispense with the ring 55 carrying the indicia 56 and 57, and form these indicia directly in the upper flaring surfaces 60 of the member, E, as indicated in Fig. 7. This will cheapen the construction somewhat without impairing its efficiency, as long as these indicia are not projecting from the surfaces 60, which might interfere with the sliding of the coin 34 thereon.

The operation of this device is substantially, as follows:

Assume this apparatus being used by a tobacconist who sells cigars of different prices, cigarettes, tobacco, pipes, etc., a purchaser desiring to buy a, say 5 cent cigar, drops the proper coin into the coin slot 24, which coin will fall onto the disk 31. By whirling this disk by the button 29, the coin 34 will be projected from said disk and passing underneath the transparent ring 36, will drop into one of the series of spaces 15, and rest upon the upper flaring surface of the member E resting against the inner wall of the tubular extension 12. This coin can be readily seen through the transparent ring 36. Should this coin fall into the space indicated by the character 57, the purchaser, in addition to receiving the purchased article, will then be entitled to receive a bonus, which the vender may have offered. The purchase having been completed, the vender pushes the rod 47 by the button 48, which depressed the drop bottom E, and causes the coin to slide off the inclined surface 60 and drop into the coin repository B.

It will now be noted that this device is not restricted to coins of a certain denomination. Should a purchaser desire to obtain an article of the value of 10 cents or more, he deposits the coin of the proper value into the coin slot, and when the vender has convinced himself that the coin is of the correct value, he delivers the article purchased and deposits the coin into the coin repository.

By purchasing an article of greater value than the smallest coin unit, for instance purchasing an article costing 15 cents, the purchaser may drop first a coin of less value into the apparatus and whirl the button 29; and wherever this coin falls, will determine whether the purchaser is entitled to the premium or not. He then completes the purchase by dropping additional coin into the coin slot; and if more than one coin is required to make up the full amount, he can drop all the additional coins into the coin slot, one after the other, and then whirl the button to project them all at the same time into whatever compartment they may drop, and the vender having ascertained that the full amount has been deposited, delivers the purchased article. One advantage derived from the use of this apparatus is that the vender never handles the purchase money, thereby preventing theft by dishonest employees. This advantage will, in most cases, more than pay for the premium which the purchaser may receive if the coin reaches the premium-designating compartment.

It will be further observed that when this apparatus is attractively made, it will be an ornament on any store counter, and by its attractiveness, and the probable receiving of a premium, draw trade to the store.

Having thus fully described the preferred embodiment of my invention, I claim as new and desire to secure to myself by Letters Patent of the United States—

1. In an apparatus of the nature described, the combination, of a casing, said casing having a top, there being in said casing a coin-receiving compartment, said casing having a reduced, tubular, extension, a series of inwardly-radiating, horizontally-disposed bars extending from the inner wall of said tubular extension to afford spaces between said bars, a cup-shaped member located centrally in said extension, said cup-shaped member having a vertically disposed rim, said bars terminating in said rim, and a spider, said spider being vertically movable, said spider having a series of members constructed to enter said spaces, said members having downwardly inclined portions entering said spaces, said portions affording movable bottoms for said spaces.

2. In an apparatus of the nature described, the combination, of a casing, said casing having a top and a bottom affording a coin depository, there being on the casing a reduced tubular extension, a series of bars radiating inwardly, and horizontally from the interior wall of said extension, to afford spaces between said bars, a cup-shaped member located centrally in said extension, said cup-shaped member having a downwardly-extending rim, said bars terminating in said rim, and a spider, said spider being vertically movable, said spider having a series of members constructed to enter said spaces, said members having downwardly inclined portions, said portions affording bottoms for said spaces, and means for depressing said spider.

3. In an apparatus of the nature described, the combination, of a casing, said casing having a coin receiving compartment, said casing having at its upper end a reduced, tubular extension, a cover for said casing, said cover having a rim constructed to embrace said extension and a horizontally disposed flange, there being in said flange a series of openings, a transparent, plane, ring located on the upper margin of said extension and underlying said flange, and an index-carrying member for each of said openings.

4. In an apparatus of the nature described, the combination, of a casing, said casing having a coin-receiving chamber, said casing having in its top a series of inwardly-extending, horizontally disposed bars, said bars affording open spaces therebetween, a centrally located, inverted, cup-shaped member, said member having a downwardly extending rim, said bars terminating in said rim, said member having a downwardly extending, centrally-located, tubular boss, a bolt in said downwardly extending tubular boss, said bolt having a head, a spiral spring surrounding said bolt, a spider secured to the lower end of said bolt, said spider comprising a tubular boss surrounding said downwardly extending tubular boss, a series of spokes radiating from said tubular boss, a rim in which said spokes terminate, a series of vertically disposed walls rising from said rim, said vertically disposed walls terminating in downwardly inclined plates, said plates being constructed to enter the spaces between said bars and affording bottoms for said spaces, and means for depressing said spider.

5. In an apparatus of the nature described, the combination, of a casing, said casing having a coin receiving compartment, there being on said casing a top, there being in said top a series of openings, a movable bottom in each of said openings, a cover for said casing, said cover having a series of openings registering with the openings in said casing, a transparent, plane, ring underlying said cover, and a ring on said cover, said ring having a series in indicia registering with the openings in said cover.

6. In an apparatus of the nature described, the combination, of a casing, said casing having a coin receiving compartment, there being on said casing a top, there being in said top a series of openings, a movable bottom in each of said openings, said bottoms being connected to a member common to all the bottoms, a cover for said casing, said cover having a series of openings registering with the openings in said casing, a transparent, plane, ring underlying said cover, a ring on said cover, said ring having a series of indicia registering with the openings in said cover, a rotatable disk in said cover, means for rapidly rotating said disk, a coin slot in said cover, and means for depressing said movable bottom.

In testimony that I claim the foregoing as my invention, I have hereunto set my hand at Peru, Ill., this 7th day of October, A. D. 1916.

GEORGE KERN.

Copies of this patent may be obtained for five cents each, by addressing the "Commissioner of Patents, Washington, D. C."